United States Patent [19]
Thornton

[11] 4,349,176
[45] Sep. 14, 1982

[54] ELECTRICAL TERMINAL CONSTRUCTION

[75] Inventor: Douglas M. Thornton, Rochester, Mich.

[73] Assignee: Ross Operating Valve Company, Detroit, Mich.

[21] Appl. No.: 122,755

[22] Filed: Feb. 19, 1980

[51] Int. Cl.³ .................... F16K 31/02; H01R 33/06

[52] U.S. Cl. .................... 251/129; 339/186 M; 339/14 P; 339/195 M

[58] Field of Search .................... 251/129, 141; 339/186 R, 186 M, 14 P; 335/278

[56] References Cited

U.S. PATENT DOCUMENTS

| | | | |
|---|---|---|---|
| 2,323,736 | 7/1943 | Tousley | 339/195 M |
| 3,199,060 | 8/1965 | Marasco | 339/184 R |
| 3,984,169 | 10/1976 | Armstrong et al. | |
| 4,211,257 | 7/1980 | Sakakibara et al. | 251/129 X |
| 4,238,110 | 12/1980 | McCabe | 251/129 |

FOREIGN PATENT DOCUMENTS

| | | | |
|---|---|---|---|
| 2429205 | 10/1975 | Fed. Rep. of Germany | 251/129 |
| 484005 | 4/1938 | United Kingdom . | |
| 495046 | 11/1938 | United Kingdom . | |
| 602580 | 5/1948 | United Kingdom . | |
| 1497078 | 1/1978 | United Kingdom . | |
| 1497286 | 1/1978 | United Kingdom . | |

*Primary Examiner*—Arnold Rosenthal
*Attorney, Agent, or Firm*—Harness, Dickey & Pierce

[57] ABSTRACT

A construction for the housing of a unit which has a pair of male supply terminals and a differently oriented male ground terminal, which precludes improper mating and potential shock hazard. The construction comprises a shroud surrounding the housing surface from which the terminals protrude and which corresponds to the female outlet housing contour and thus permits insertion of the terminals in only the correct position.

5 Claims, 3 Drawing Figures

FIG. 1.
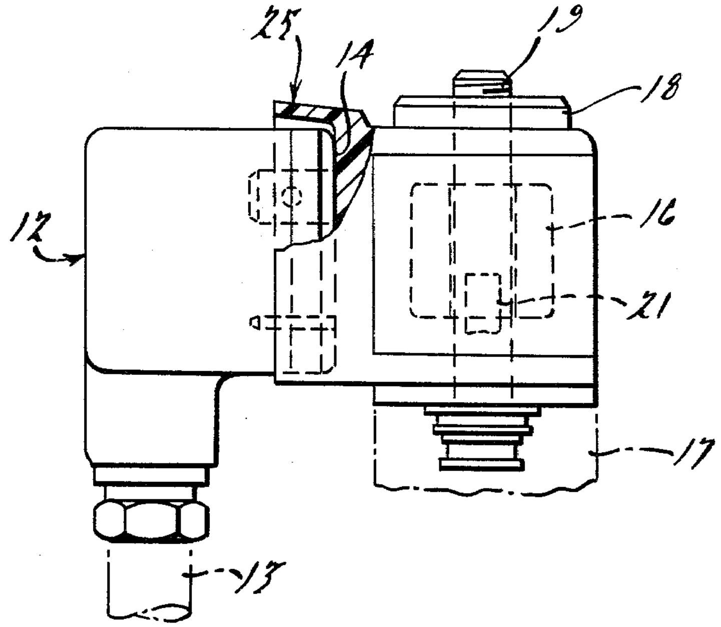
FIG. 2.
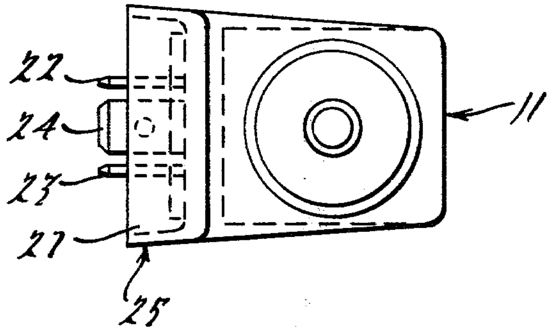
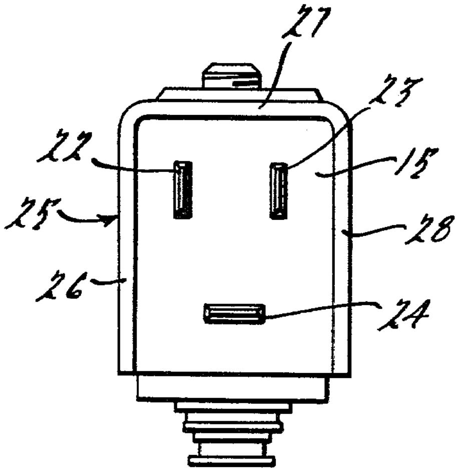
FIG. 3.

ELECTRICAL TERMINAL CONSTRUCTION

BACKGROUND OF THE INVENTION

1. Field of the Invention

The invention relates to electrical terminals, particularly industrial connectors which have two power terminals and a ground terminal with a different orientation. Examples of such connectors are found in the industrial valve field, where a solenoid for a pilot valve is in a housing which has male terminals, and is to be connected to an outlet which may be attached to a cable conduit.

2. Description of the Prior Art

A prior construction has a solenoid housing with a rectangular face, two parallel male power terminals in the form of flat strips protruding from the face, and a ground terminal protruding in a plane at right angles to the two power terminals. This unit is intended to be inserted in the female terminals of an outlet with a matching surface. It is possible with this arrangement to insert one of the male power terminals in the wrong female terminal, leaving an energized power terminal exposed, with potential shock hazard.

One approach to avoiding this possibility is to have male terminals which have curved cross sectional shapes instead of flat shapes. This changed male terminal construction however requires that the conventional female outlet terminals to be changed in a like manner. Since the female outlet terminals are often pre-existing, that is an expensive and time-consuming change.

BRIEF SUMMARY OF THE INVENTION

It is an object of the present invention to provide a novel and improved electrical terminal construction which overcomes the above-described disadvantages of previous constructions and prevents inadvertent insertion of the male terminals which might cause a shock hazard.

It is another object to provide an improved terminal construction of this character which would require no change in pre-existing female outlet terminal constructions.

Briefly, the invention comprises a male terminal housing having a surface, a pair of flat male power terminals extending from said face, a male ground terminal extending from said face with a different orientation than said power terminals, and a shroud at least partially surrounding and extending from said surface, said shroud following in configuration the shape of a female outlet housing surface to which said first mentioned terminal housing surface is to be mated, whereby mismatching of said terminals will result in interference between said shroud and said female outlet housing surface to prevent terminal insertion.

BRIEF DESCRIPTION OF THE DRAWINGS

FIG. 1 is a side elevational view of the terminal of this invention;

FIG. 2 is a top plan thereof; and

FIG. 3 is a front elevational view.

DESCRIPTION OF THE PREFERRED EMBODIMENT

The terminal of this invention is generally indicated at 11 and is intended to mate with a female outlet terminal generally indicated at 12. The female outlet terminal housing could for example be attached to the end of a cable 13, and has a rectangular surface 14 with three openings (not shown) for gaining access to the female terminals.

The male terminal housing is of general rectangular shape as seen in FIG. 3 and has a rectangular surface 15 which is intended to mate with surface 14. The housing is shown as enclosing a coil 16 which could be for operating a pilot valve the attached housing of which is shown partially at 17. In particular, a screw cap 18 is shown as being mounted on a tubular member 19 which extends upwardly from the pilot valve housing and surrounds a valve plunger 21.

Two of the terminals 22 and 23 of unit 11 are male power terminals. They are shown as being parallel to each other in the form of flat strips and extending from surface 15 at the upper portion of the surface. A ground terminal 24 is provided in the lower portion of surface 15. This is also a flat member which extends from the surface but it is horizontal rather than vertical as shown in FIG. 3.

With the construction so far described, it is evident that, for example, terminal 22 could inadvertently be inserted in the female terminal which is intended for terminal 23. This would leave terminal 23 exposed and a possible shock hazard.

According to the invention, a shroud generally indicated at 25 is provided around the edge of surface 15. This shroud has three sides 26, 27 and 28. It extends toward female housing 12 when the parts are mated but surrounds surface 14, being in conformity with the outline of this surface. The shroud is shown as slightly flared to facilitate mating of the terminals. As shown in FIG. 2, this flare could be a continuation of the flared shape of housing 11.

In operation, the parts will be mated as shown in FIG. 1. If it is attempted to insert terminal 22 in the opening meant for terminal 23 this is impossible because edge portion 26 of shroud 25 will abut surface 14. The depth of shroud 25 is only slightly less than the length of the terminals so that these male terminals will not be able to reach the female terminals inside housing 12. The same protection will apply if it is attempted to insert terminal 23 in the female terminal meant for terminal 22. In this case shroud portion 28 will abut surface 14 of the female outlet housing.

If housing 11 is turned upside down and it is attempted to insert one or both of male terminals 22 and 23 in the female terminal openings, shroud portion 27 will abut surface 14 and prevent insertion. It is thus seen that there is only one way to mate the two terminals and that is in the manner which prevents potential shock hazard.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. A safety arrangement for preventing an open electrical connection from being formed with a socket of the type consisting of a socket housing having a generally rectangular peripheral surface terminating in a face surface in which female socket openings are formed, a male terminal housing having a male terminal having a surface adapted to abuttingly engage said socket housing face surface when connected thereto, a pair of flat male power terminals extending from said male terminal housing surface, a male ground terminal extending from said male terminal housing surface with a different orientation than said power terminals, and a shroud at least partially surrounding and extending from said male terminal housing surface, said shroud being formed from a pair of generally parallel legs and a single intersecting leg generally perpendicular to said generally parallel legs and integrally connected thereto, for conforming to the shape of said socket housing peripheral surface to which said male terminal housing surface is to be mated, whereby mismatching of said terminals will result in interference between said shroud and said socket housing face surface to prevent terminal insertion.

2. The combination according to claim 1, said two power terminals being parallel, said ground terminal being flat and at right angles to said power terminals.

3. The combination according to claim 2, said shroud being flared in an outward direction.

4. The combination according to claim 2, said male terminal housing containing a solenoid.

5. The combination according to claim 4, further provided with a valve plunger within said male terminal housing and operated by said solenoid.

* * * * *